US009319439B2

(12) United States Patent
Zhang et al.

(10) Patent No.: US 9,319,439 B2
(45) Date of Patent: Apr. 19, 2016

(54) SECURED WIRELESS SESSION INITIATE FRAMEWORK

(71) Applicant: TangoMe, Inc., Palo Alto, CA (US)

(72) Inventors: Meng Zhang, Mountain View, CA (US); Xiaopeng Gu, Palo Alto, CA (US); Jag Saund, Mountain View, CA (US); Gregory Dorso, San Jose, CA (US)

(73) Assignee: TangoMe, Inc., Mountain View, CA (US)

( * ) Notice: Subject to any disclaimer, the term of this patent is extended or adjusted under 35 U.S.C. 154(b) by 449 days.

(21) Appl. No.: 13/834,152

(22) Filed: Mar. 15, 2013

(65) Prior Publication Data

US 2014/0108668 A1    Apr. 17, 2014

Related U.S. Application Data

(60) Provisional application No. 61/645,249, filed on May 10, 2012.

(51) Int. Cl.
H04L 29/06 (2006.01)
H04L 29/08 (2006.01)
H04M 3/42 (2006.01)
H04W 76/02 (2009.01)

(52) U.S. Cl.
CPC ............ H04L 65/1069 (2013.01); H04L 65/80 (2013.01); H04L 67/02 (2013.01); H04M 3/42042 (2013.01); H04W 76/02 (2013.01)

(58) Field of Classification Search
CPC ... H04L 67/02; H04L 67/26; H04L 29/06183; H04M 3/42042
See application file for complete search history.

(56) References Cited

U.S. PATENT DOCUMENTS

| 6,694,145 | B2 * | 2/2004 | Riikonen et al. ............. 455/502 |
| 7,047,561 | B1 * | 5/2006 | Lee ................................ 726/12 |
| 9,041,763 | B2 * | 5/2015 | Hsu ........................ H04N 7/152 348/14.01 |
| 2003/0123488 | A1 * | 7/2003 | Riikonen et al. ............. 370/503 |
| 2005/0286538 | A1 | 12/2005 | Oberle et al. |
| 2007/0047523 | A1 * | 3/2007 | Jiang ............................ 370/352 |
| 2007/0291736 | A1 * | 12/2007 | Furlong ............. H04L 12/2803 370/352 |
| 2009/0319674 | A1 | 12/2009 | Yahyaoui et al. |
| 2010/0135292 | A1 | 6/2010 | Woo et al. |

(Continued)

FOREIGN PATENT DOCUMENTS

EP    1804455 A1    7/2007

OTHER PUBLICATIONS

"International Search Report PCT/2013/040586", 10 Pages, Aug. 23, 2013.

(Continued)

Primary Examiner — Lashonda Jacobs

(57) ABSTRACT

A method for reducing a call establishment time in real-time communication between at least two devices. The method includes: receiving, at a first internal server of a system, a first communication from a caller, wherein the first communication is a push request that comprises an attempt to initiate a connection with a callee; and sending a push notification via the first internal server to the callee, wherein the first internal server has at least two interfaces, wherein each interface of the at least two interfaces comprises a User Datagram Protocol (UDP) port, wherein the sending includes: embedding, by the first internal server and inside the push notification, an external UDP (IP, port) pair, of the at least two interfaces, to which the callee is able to connect.

16 Claims, 5 Drawing Sheets

(56) References Cited

U.S. PATENT DOCUMENTS

| | | | |
|---|---|---|---|
| 2010/0268832 A1 | 10/2010 | Lucas et al. | |
| 2012/0019609 A1* | 1/2012 | Chang | H04M 7/0057 348/14.01 |
| 2013/0047034 A1* | 2/2013 | Salomon et al. | 714/18 |
| 2013/0336309 A1* | 12/2013 | Laasik et al. | 370/352 |
| 2013/0336311 A1* | 12/2013 | Laasik | H04M 7/006 370/352 |
| 2014/0112333 A1* | 4/2014 | Oberle et al. | 370/352 |
| 2015/0163117 A1* | 6/2015 | Lambeth | H04L 47/2441 709/224 |

OTHER PUBLICATIONS

Koponen, Aila H., "A Floow Control Server in a Distributed Conference Service", Apr. 18, 2008, 107 pages.

"13787484.8 Extended Supplementary Search Report", pp. 1-5.

* cited by examiner

SECURED WIRELESS SESSION INITIATE FRAMEWORK

CROSS REFERENCE TO RELATED APPLICATIONS

This application claims priority to and benefit of co-pending U.S. Patent Application No. 61/645,249 filed on May 10, 2012 entitled "SECURED WIRELESS SESSION INITIATE FRAMEWORK" by Zhang et al., assigned to the assignee of the present application, and incorporated herein by reference.

BACKGROUND

Current technologies and methods rely on XMPP/TURN/STUM/ICE "jabber" protocols (rooted in the instant messenger days) in order to connect two clients for real-time communication, either directly peer-to-peer (by successfully traversing NAT) or via a network relay (TURN). More specifically, current technologies include the following jabber-based solutions: ejabberd (existing popular XMPP server solution based on Erlang); OpenFire; Tigase; libjingle (Google's open-source implementation for p2p clients); TURN server (http://turnserver.souceforge.net/); and STUN server (http://sourceforge.net/projects/stun/). Regardless of the implementation, current XMPP-based technologies suffer from long connection times and many round-trips.

The longer the call establishment (connection) time between the caller and the callee, the more likely it is that the caller is going to hang up, out of impatience and frustration. Thus, the faster the connection time, the higher the probability is that a call connection will be established.

Figure 1A:
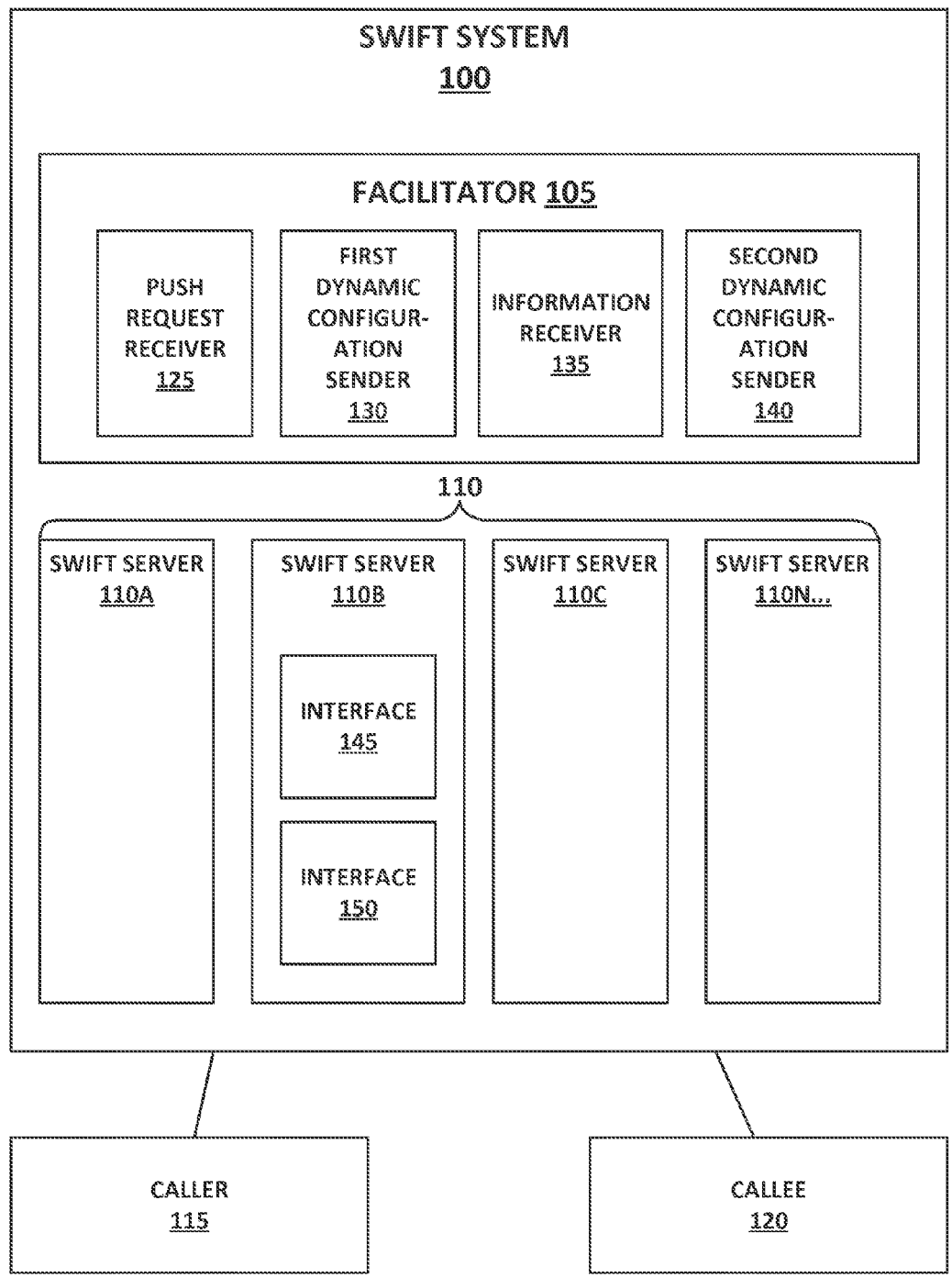
FIG. 1A depicts a secured wireless session initiative framework tango ("SWIFT") system for reducing the connection establishment time during the connection of two clients in real-time communication, in accordance with an embodiment.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The discussion below will first describe an overview of the conventional technology, and then give a brief description of embodiments which improve upon the conventional technology. The discussion will next turn to description of FIG. 1A, FIG. 1B, FIG. 2, FIG. 3A, FIG. 3B, a system and methods for reducing call establishment time, in accordance with various embodiments.

Overview

The implementation of traditional XMPP-based technologies in establishing a real-time connection between two clients suffer from long connection times and many round-trips. For example, the traditional protocol for call establishment is serialized: steps are performed in a serial manner such that a lot of back and forth communication occurs between the client and the server before a call connection is established.

The longer the call establishment (connection) time between the caller and the callee, the more likely it is that the caller is going to hang up, out of impatience and frustration. Conversely, the faster the connection time, the higher the probability is that the caller will stay on the line and a call establishment is going to take place. The call establishment time is a significant factor in terms of the percentage of the calls that actually connect.

Further, a mobile network may be different network types (e.g., 3G, wifi). Traditional session initiation protocol requires the renegotiation of one of the network switches during a call establishment, causing the client to feel "stuck" in his call. Embodiments provide for a system and method for accomplishing a connection between two clients for real-time communication with significantly less connection overhead (e.g., roundtrips), and consequently, a reduction in the feeling of being "stuck".

As opposed to the conventional technology which requires separate connections to TURN/STUN and jabber servers, embodiments use the same server for NAT traversal, call establishment, and traffic relay, thereby helping to re-establish calls (e.g., on a 2G/wifi switch) and further reducing the number of connections a client needs to open and/or manage during the call establishment process.

Further, since embodiments include a protocol that is UDP based by default, it is able to make full utilization of the wireless channel. Because packet loss on cellular networks is usually random and due to wireless interference rather than an indication of congestion, TCP based protocols are inappropriate to make best use of the available bandwidth on a cellular network as they interpret such packet loss as congestion, and react by backing off. This poor behavior is exacerbated when the connection establishment relies on a large amount of round trips (such as 17 for a traditional call establishment protocol). As we use UDP by default, we are able to use our own retransmission control on top of UDP that can avoid such meaningless waiting and is much more resistant to random packet loss on cellular networks. Therefore, we get a much faster connecting speed. In addition to this, there are advantages when network interfaces are independently switched (such as Wifi to Cellular and back): a full TCP connection would have to be reestablished in order to reestablish a "client context" so the server knows it is actually the same connection as before. The use of UDP is much lighter weight than the use of TCP as each packet contains enough information about such context for the server to perform an immediate switch as soon as it receives a UDP packet from a new interface.

In sum, embodiments enable a reduction in the call setup time. The traditional call establishment time takes 17 to about 28 round-trip times and most of the packets are transmitted through a TCP connection, which may itself suffer from large TCP retransmission time-outs. Embodiments enable the call establishment time to be reduced to about three round-trip times and uses the UDP protocol by default. Thus, with fewer round-trip times and using the UDP protocol, the call establishment success rate is increased by decreasing the traditional "jabber login failures" and the other XMPP related timeouts, which currently, occupy about six percent of all call establishment attempts.

DETAILED DESCRIPTION OF EMBODIMENTS

Figure 1B:
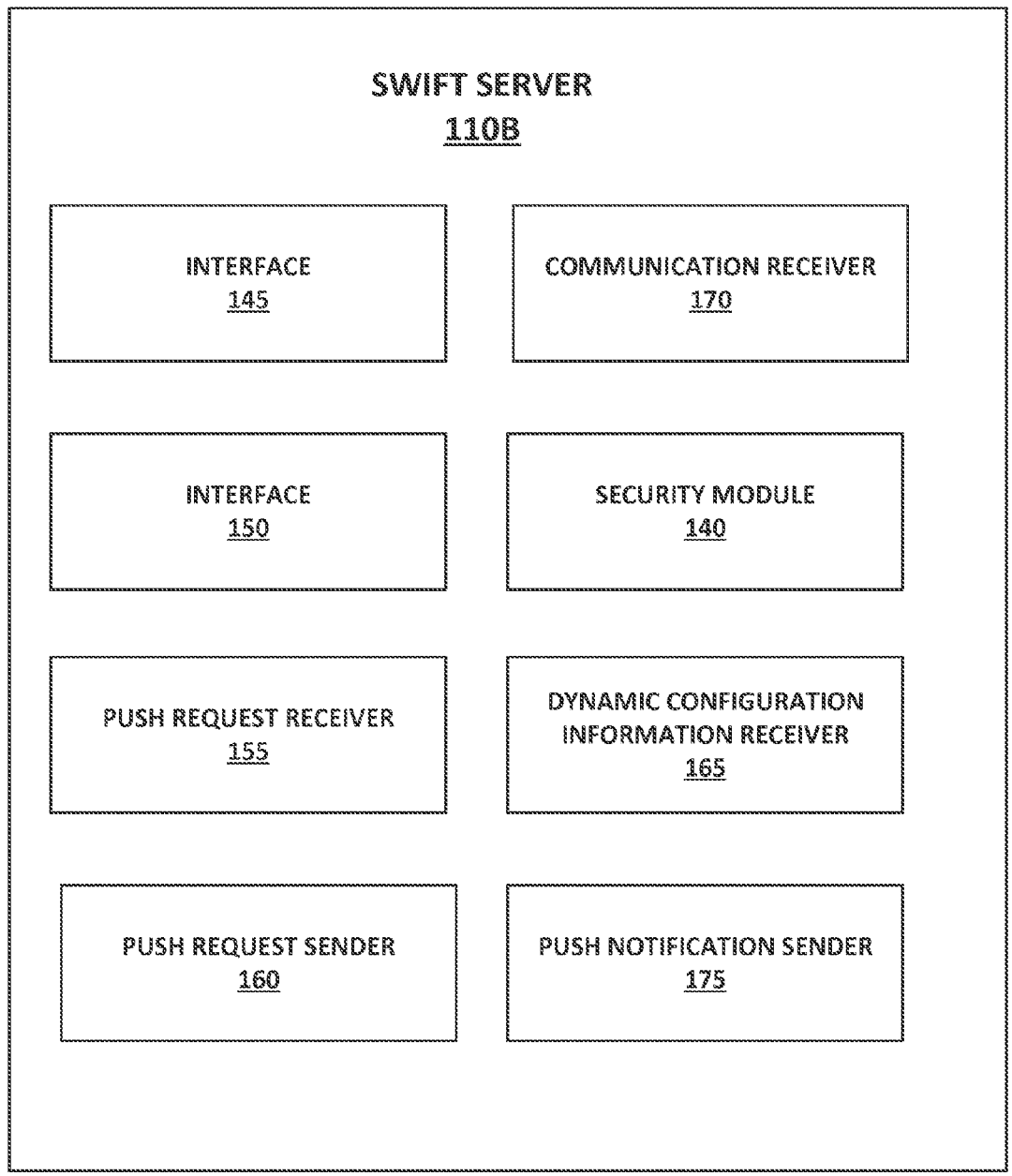
FIG. 1B depicts a SWIFT server for reducing the connection establishment time during the connection of two clients in real-time communication, in accordance with an embodiment
Figure 2:
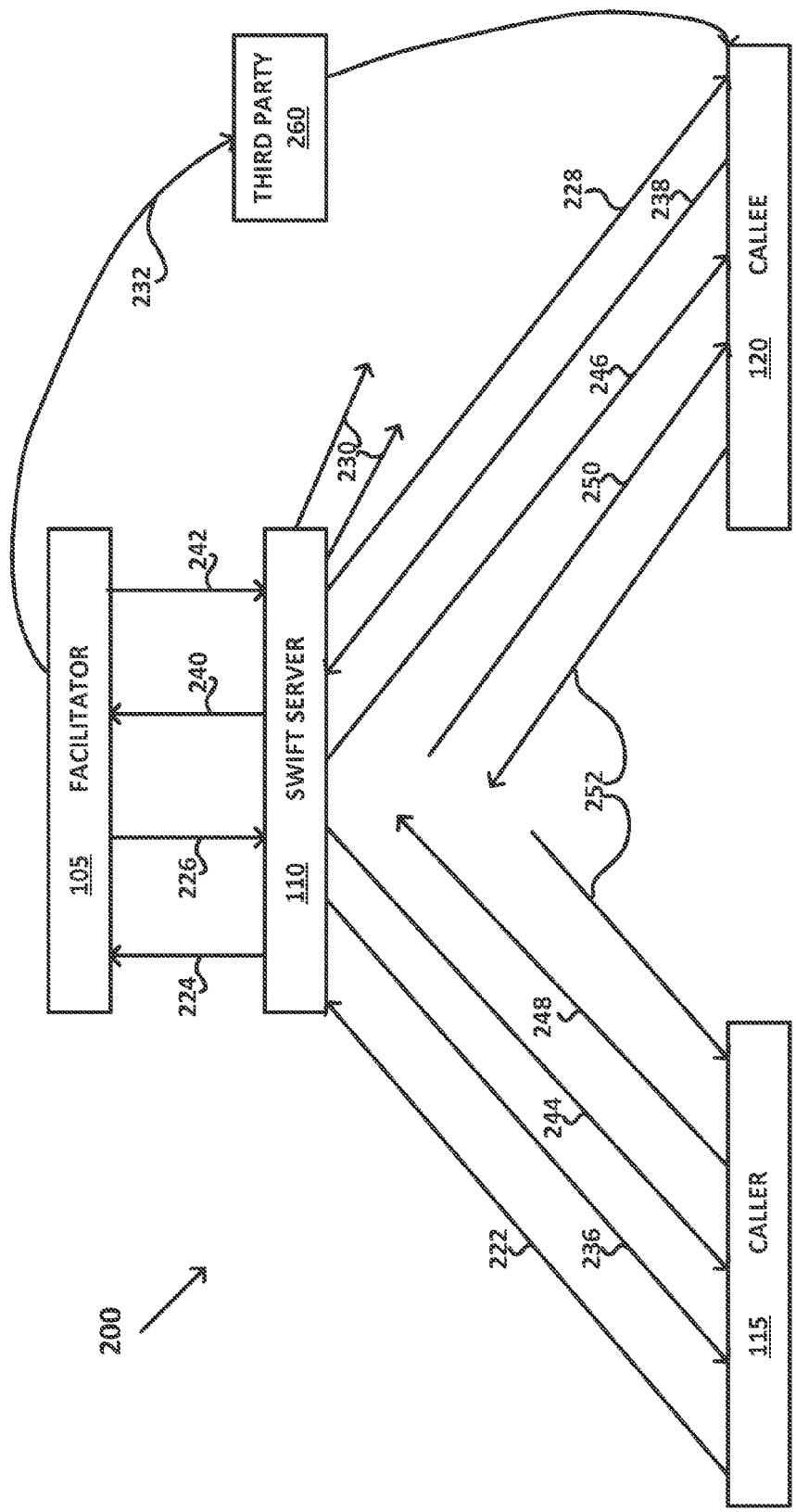
FIG. 2 depicts a flow chart of a method for reducing the connection establishment time during the connection of two clients in real-time communication, in accordance with an embodiment.

FIG. 1A depicts a secured wireless session initiation framework tango ("SWIFT") system 100 for reducing the connection establishment time during the connection of two clients in real-time communication, in accordance with an embodiment. FIG. 1B depicts a SWIFT server 110B, in accordance with an embodiment. FIG. 2 depicts a flow chart of a method 200 performed by the SWIFT system 100, the method 200 for reducing the connection establishment time during the connection of two clients in real-time communication.

In brief, the SWIFT system 100 includes: a facilitator 105 (server internal to the SWIFT system 100); and at least one SWIFT server 110A, 110B, 110C, and 110n . . . ("SWIFT server 110", unless otherwise noted. The SWIFT server 110 is also described below in the context of a "first internal device 110". The SWIFT server 110 is an example of a first internal device 110. The facilitator 105 is described below, in some embodiments, in the context of the "second internal device 105".)

Each SWIFT server 110 includes two interfaces. One of the interfaces 145 is a Virtual IP ("VIP") (internal IP), while the other interface 150 is an external open IP. The VIP is a load-balancing instance that allows IP traffic to be split across multiple servers. The VIP has an IP address, which must be publicly available to be useable. The VIP has at least one real server assigned to it, to which it will dispense traffic. Usually, there are multiple real servers, and the VIP will spread traffic among them.

In embodiments, each interface includes a Transmission Control Protocol (TCP) port and a User Datagram Protocol (UDP) port.

Overall, the SWIFT server 110 helps both initiate a session between two clients and relay traffic between them if necessary. (The SWIFT server 110 maintains a routing table that maps a username to a particular UDP IP/port or TCP socket of the client. Each entry in the routing table will be updated from the client traffic. If no packet is received from a particular TCP socket or UDP IP port within 60 sec., it will be removed from the routing table. Except for this table, the swift server 110 does not keep any states from the client, so we call SWIFT server 110 a stateless server. When the SWIFT server 110 goes down or crashes, it will quickly regenerate the whole routing table by receiving the client traffic and recover the service fast. Due to this same stateless characteristic, it supports client seamless WiFi/3G switching naturally.

Referring now to FIG. 1A, FIG. 1B, and FIG. 2, at operation 222, the caller client 115 ("caller 115") initiates a call, by first trying to connect to the load balancer of the SWIFT server 110 by sending a push request to the SWIFT server 110. This push request from the caller 115 to the callee 120 includes the account identification of the caller 115. The load balancer will direct the call to one of the SWIFT servers 210. The DNS anycast is used to find the proper site between the different load balancers (sites).

At operation 224, the SWIFT server 110, sends the push request of operation 222 to the facilitator 105, including the account identification information through the HTTP restful API between the SWIFT server 110 and the facilitator 105.

At operation 226, the facilitator 105 sends an information list for the callee 120 and dynamic configuration information to the SWIFT server 110. This dynamic configuration information is based on the device type and the network type (3G/WiFi) only for the caller 115.

At operation 228, the SWIFT server 110 opportunistically sends "fast push" (a push notification) immediately to the callee 120. This fast push wakes up the callee 120 if the callee 120 is already connected to the SWIFT server 110. The SWIFT server 110 embeds its own external TCP and UDP IP/ports inside the "fast push" payload sent to the callee 120. The callee 120 will then be able to connect to this external IP port. "Fast push" is UDP based by default, so it will be sent multiple times to the callee.

At the same time that the fast push is sent at operation 228 to callee 120, at operation 232, the facilitator 105 sends a push request to a push service provided by either third-party or Tango (e.g., the push service provided by Apple™, Google™ (GCM/C2DM), Microsoft™, Tango™) and then a push notification is sent to the callee 120 to wake it up. Like "fast push", this push notification will contain the SWIFT server 110's TCP and UDP IP/ports.

Of note, in one embodiment, after the operation 226 in which the facilitator 105 sends the push notification to the SWIFT server 110, both the fast push at operation 228 and the third party notification push at operation 232 occur simultaneously. The fast push notification at operation 228 reaches the callee 120 faster than the third party push notification at operation 232. In another embodiment, at operation 232, the facilitator 105 sends the push notification to multiple devices.

Additionally, at operation 236, the SWIFT server 110 sends a push response to the caller 115, in which the callee's 120 information and its dynamic configuration is sent to the caller 115.

At operation 238, the callee 120 has received the push notification (either through operation 228, or operation 232) which contains the exact UDP and TCP IP/port of the SWIFT server 110, and sends to the SWIFT server 110 a "connect" message. In certain iOS and Winphone cases, it also contains an "acceptance flag" set by the callee to signify that it 120 will accept the communication from the caller 115. In some situations, the callee 120 indicates his acceptance of the intended communication through his display screen on his calling device (e.g., Android, PC) and hence the "accept" message will be sent separately.

At operation 240, the SWIFT server 110 sends to the facilitator 105 information regarding the callee 120 (e.g., network interface used) and queries the facilitator 105 for the best algorithm to use for the video/audio/network rate control between the caller 115 and the callee 120. Of note, the facilitator 105 already has the information for the caller 115, gathered at operation 224. At operation 242, the facilitator 105 sends to the SWIFT server 110 the dynamic configuration that will include the best algorithm to use in the communication connection between the caller 115 and the callee 120. For example, if both the caller 115 and the callee 120 use wifi, they will use a different network control algorithm. In order to determine the best algorithm to use and in order to accommodate the use of the different networks by the caller 115 and the callee 120, the facilitator 105 needs to know the configuration of both the caller 115 and the callee 120.

At operation 244, the dynamic configuration that was sent to the SWIFT server 110 at operation 242 is forwarded to the caller 115. And also, the SWIFT server 100 will embed the external IP/port of callee 120 into this message in operation 244, which is used for NAT traversal later to generate a peer-to-peer direct channel between caller 115 and callee 120. Additionally, at operation 246, the dynamic configuration that was sent to the SWIFT server 110 at operation 242, is sent to the callee 120.

Of note, the caller 115 and the callee 120 only communicate with the SWIFT server 110 (or receive communication from the third party 260). However, the SWIFT server 110 gets information corresponding to the dynamic configuration information corresponding to the caller 115 and the callee 120 from the facilitator 105.

At operation 248, the caller 115 sends a signal to the SWIFT server 110, acknowledging the receipt of the data that was forwarded to the caller 115 by the SWIFT server 110 from callee 120 at operation 244.

At operation 250, the SWIFT server 110 sends the acknowledgment communication of operation 248 to the callee 120. The SWIFT server 110 will also put the external IP/port of caller 115 into the message at operation 250 for NAT traversal (generating peer-to-peer direct connection) purposes of the callee 120.

At operation 252, in one embodiment, in the case of an Android™ or a PC, the push notification that was sent at operation 228 (or similar operation) is not shown on the screen of the device which the callee 120 is using. The callee 120 is notified of the push notification in another manner showing the push notification on the device display of the callee 120. In this situation, the callee 120 sends an additional acceptance to the caller 115 to indicate that the callee 120 has accepted communication with the caller 115.

The SWIFT server 110, in one embodiment, functions as a relay channel, and this channel is used to transmit video/audio data between the caller 115 and callee 120 immediately.

In one embodiment, after the relay channel is created, the caller 115 and callee 120 will try to use the external IP/port of each other to generate a direct peer-to-peer channel. If such attempt is successful, the SWIFT system 100 switches from using the relay channel of the SWIFT server 110 to using a peer-to-peer channel. The peer-to-peer channel is a direct channel between the caller 115 and the callee 120 (clients). By switching to the peer-to-peer channel from the relay channel, embodiments are creating a more direct pathway over which packets comprising the communication between the caller 115 and the callee 120 may travel. This more direct pathway provides a faster traversal of the packets, less delay, and a reduction of the load on the server. The switch is seamless, so that there is no user-perceivable (audio/video glitches) indication of the change from operations being performed using the relay channel to those being performed on the peer-to-peer channel. The caller 115 and callee 120 keep contacting the SWIFT server 110 even if the peer-to-peer channel is in use and hence the packets on the way of relay channel during switch will not be missing.

Figure 3A:
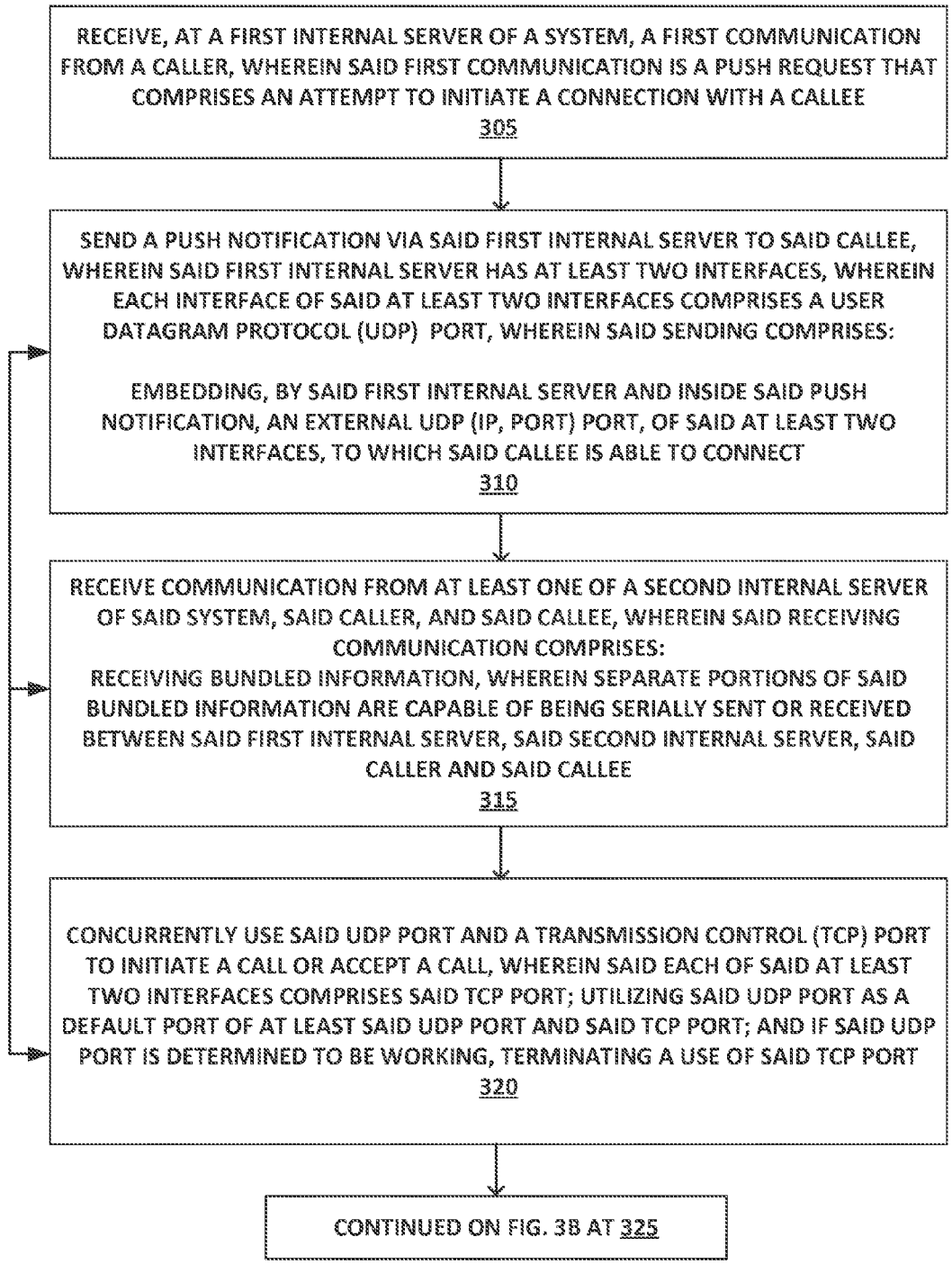
FIG. 3A and FIG. 3B depict a flow chart of a method for reducing the connection establishment time during the connection of two clients in real-time communication, in accordance with an embodiment.
Figure 3B:
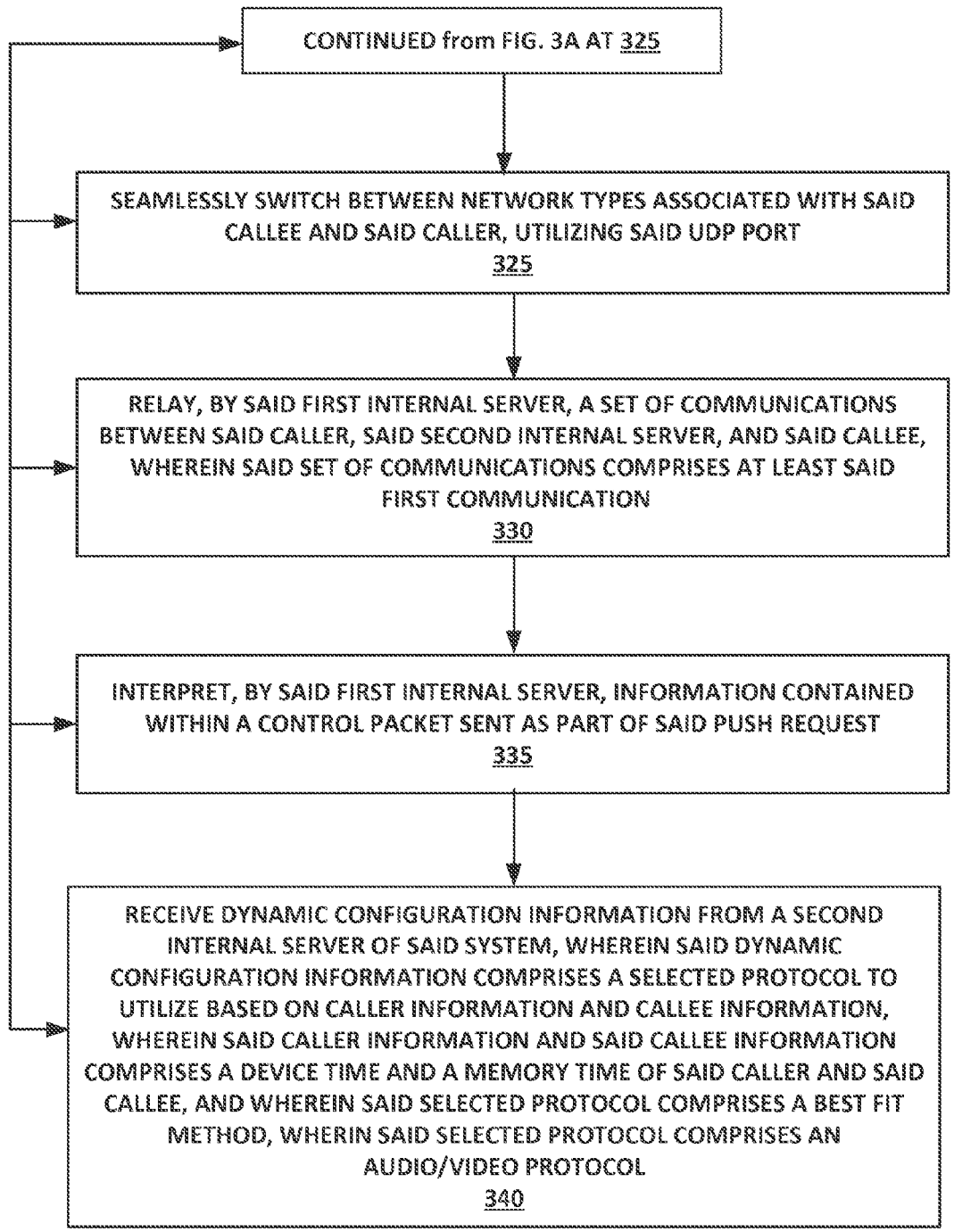

With reference to FIG. 2, FIG. 3A, and FIG. 3B, flow charts of methods for reducing the call setup time during the connection of two clients in real-time communication is shown, in accordance with an embodiment. In various embodiments, methods 200 and 300 are carried out by one or more processors and electrical components under the control of computer-readable and computer-executable instructions. The computer-readable and computer-executable instructions reside, for example, in tangible data storage features such as a computer usable volatile and non-volatile memory. However, the computer readable and computer executable instructions may reside in any type of computer readable storage medium. In some embodiments, methods 200 and 300 are performed by the facilitator 105 and the SWIFT server 110, as described with respect to FIG. 1A and FIG. 1B, or by systems, such as the SWIFT system 100 described herein.

With reference still to FIG. 1A, in one embodiment, and as already described herein, the first internal server, as labeled 110B, is the SWIFT server 110. The SWIFT server 110B acts as a relay device between the clients (caller 115 and callee 120). Referring now to FIG. 1A and FIG. 1B, the SWIFT server 110B (of SWIFT server 110) is shown in accordance with an embodiment. The SWIFT server 110B includes the following components: a push request receiver 155; and a push notification sender 175. The SWIFT server 110 also optionally includes the following components: a push request sender 160; a communication receiver 170; a security module 140; a dynamic configuration information receiver 165; an interface 145; an interface 150; and a push notification responder (not shown). The security module 140 optionally includes: a decrypter configured for decrypting a control packet received at the first internal server, wherein the control packet is part of the push request; a password accessor configured for accessing a password encapsulated in a header of the control packet, wherein the decrypter is further configured for decrypting the control packet using the password; and a signature comparer and a control packet authenticator. The signature comparer is configured for comparing a first signature corresponding to the caller with a second signature positioned in the header. The control packet authenticator is coupled with the signature comparer, and is configured for authenticating the control packet if the first signature matches the second signature and the decrypting is successful.

The SWIFT server 110 receives, sends, and responds to push requests through various modules within the SWIFT server 110, such as the following: a push request receiver 155 used in connection with operation 222 to receive the push request from the caller 115; a push notification sender 175 used in connection with operations 224, 228, 230 to send the push notification to the callee 120; a push notification responder used in connection with operation 236 to respond to the connect flag sent at operation 238 by sending the information of the callee 120 to the caller 115; and the two interfaces 145, and 150.

Even though the SWIFT server 110 generally just relays information between the caller 115, the callee 120, and the facilitator 105, the SWIFT server 110 actually interprets the information in the control packets (A control packet contains information being sent between the clients and the facilitator 105 during call establishment. For example, the push request of operation 222 from the caller 115 contains (or is) a control packet.) (This push request is sent to the facilitator 105 by the SWIFT server 110 by the push request sender 160.)

Embodiments also provide a system and method for communicating packets from the caller 115 to the callee 120 that reduce connection establishment times without sacrificing security. The SWIFT system 100, does not rely on SSL, but is lighter-weight. The SWIFT system 100 uses the following method 200: (1) the client gets an authentication token from the "provisioning center", which contains an encrypted {username, password} pair. The encryption key is shared among all of the SWIFT servers 210A-210n . . . , and is not known to the client, but the client does know the plaintext values for {username, password}; (2) all of the control packets are encrypted with the aforementioned password by the client. The SWIFT server decrypts the authentication token in each control packet with the encryption key, derives the password of the particular client and then uses the password to decrypt the payload of the control packet; (3) data packets are not encrypted by the SWIFT system 200, but could be encrypted end-to-end between two client parties; (4) to prevent "replay attack", each client estimates the server timestamp and signs it with its own password. If the server sees the timestamp is right in the proper window, the control packet gets passed the validation. Otherwise, the server will send a nonce to challenge the client. The nonce contains the client's source IP port and the current server timestamp. The client will store the difference between its own clock and the server timestamp to its local storage so that it will not get challenged again because the timestamp skew; and (5) if the server detects that a client uses a different UDP IP port or TCP socket to upload data to the server, then it will always immediately get a nonce challenge. If the nonce is successfully signed by the client, which is expected in the subsequent packets sent to the server, then the server will switch the corresponding client entry to this new TCP socket or UDP IP port.

When a control packet is sent to the SWIFT server 110, the client's password is used to encrypt the control packet and to encapsulate the packet signature and position this packet signature in the header of the control packet. The SWIFT server 110, once it receives the authentication token in the control packet header, uses the password to decrypt the control packet. The SWIFT server 110 also compares the signature it has for the client with the signature positioned in the header of the control packet. If the signatures match and the encryption is successful, then the SWIFT server 110 had authenticated the control packet. After authentication, the SWIFT server 110 accepts and processes (relays) the control packet. The SWIFT server 110 ensures that the control packets come from a particular client and then decrypts the control packet. Thus, security is not sacrificed at the expense of reducing the roundtrip times and speeding up connection establishment times, according to embodiments.

In case UDP is blocked by any firewall between the client and SWIFT server 110, TCP can also be used to establish the call, which is called firewall traversal. In order to traverse the firewall quickly, the client always uses UDP and TCP simultaneously. Once there is evidence that UDP works, TCP will be stopped. State machines will help figure out the correct time to close the TCP connection.

One of the servers' responsibility is to help establish direct peer-to-peer channel and hence to determine what the caller 115 and the callee 120 IP and port look like from the outside world. A traditional method in determining this is to send a separate request to a "TURN/STUN" server to get the "P2P candidates". In contrast to the traditional method, the SWIFT system 200 discovers the UDP IP port intrinsically during the method 200 described herein, thus avoiding the extra step (or time requirement) in determining what the caller 115 and the callee 120 IP/ports look like from the outside.

The facilitator 105 (also referred to herein as the "second internal server 105") optionally includes any of the following: a push request receiver 125; a first dynamic configuration sender 130; a second dynamic configuration sender 140; and an information receiver 135. The push request receiver 125 receives the push request from the SWIFT server 110. The first dynamic configuration sender 130 sends the dynamic configuration (best algorithm during call establishment) of the callee 120 to the SWIFT server 110. The second dynamic configuration sender 140 sends the dynamic configuration of both the callee 120 and the caller 115 to the SWIFT server 110. The information receiver 135 receives information from the SWIFT server 110 regarding both the caller 115 and the callee 120.

The facilitator 105 is employed to accomplish at least such functions as interfacing with systems like Apple™ and Google™ for the push notification. As described herein, the facilitator 105 communicates with the third party 260 to send a push notification, which wakes up the callee 120.

Thus, embodiments provide a method and system that is UDP based by default. Embodiments are therefore not as vulnerable to packet loss as it would be if using the TCP-based method or system. Further, embodiments provide for the bundling of information during the transmission of packets, thus saving more roundtrip time during which bundled information would be gathered. The steps that are done in a sequence in traditional system and methods, are done in a parallelized manner in embodiments, thereby minimizing the amount of chatter during the call establishment.

Referring now to FIG. 3A and FIG. 3B, a method 300 for reducing a call establishment time in real-time communication between at least two devices is shown, in accordance with an embodiment. At operation 305, a first communication from a caller is received, at a first internal server of a system, wherein the first communication is a push request that comprises an attempt to initiate a connection with a callee. At operation 310, a push notification is sent via said the internal server to the callee, wherein the first internal server has at least two interfaces, wherein each interface of the at least two interfaces includes a User Datagram Protocol (UDP) port, wherein the sending includes embedding, by the first internal server and inside the push request, an external UDP IP/port, of the at least two interfaces, to which the callee is able to connect.

At operation 315, communication is received from at least one of a second internal server of the system, the caller, and the callee, wherein the receiving the communication includes: receiving bundled information, wherein separate portions of the bundled information are capable of being serially sent or received between the first internal server, the second internal server, the caller, and the callee.

At operation 320, the UDP port and a transmission control protocol (TCP) port are used concurrently to initiate a call or accept a call, wherein the each of the at least two interfaces includes the TCP port. The UDP IP/port is utilized as a default port of at least the UDP IP/port and the TCP port; and if the UDP IP/port is determined to be working, the use of the TCP port is terminated.

At operation 325, the UDP IP/port is utilized for seamless switching between network types associated with the callee and the caller.

At operation 330, a set of communications is relayed, by the first internal server, between the caller, the second internal server, and the callee, wherein the set of communications includes at least the first communication.

At operation 335, information contained within a control packet sent as part of the push request is interpreted by the first internal server.

At operation 340, a control packet received at the first internal server is decrypted by the first internal server, the control packet being part of the push request. In further embodiments, a password encapsulated in a header of the control packet is accessed, and the control packet is decrypted by the first internal server using the password. Further embodiments include: comparing, by the first internal server, a first signature corresponding to the caller with a second signature positioned in the header; and authenticating the control packet, by the first internal server, if the first signature matches the second signature and the decrypting is successful.

At operation 345, dynamic configuration information is received from a second internal server of the system, wherein the dynamic configuration information includes a selected protocol to utilize based on caller information and callee information, wherein the caller information and the callee information includes a device time and a memory time of the caller and the callee, and wherein the selected protocol includes a best fit method to minimize round-trips during a connection establishment time between the caller and the callee.

Various embodiments are thus described. While particular embodiments have been described, it should be appreciated that the embodiments should not be construed as limited by such description, but rather construed according to the following claims.

What we claim is:

1. A non-transitory computer-readable storage medium having instructions stored thereon which, when executed, cause a computer processor to perform a method for reducing a call establishment time in real-time communication between at least two devices, said method comprising:
   receiving, at a first internal server of a system, a first communication from a caller, wherein said first communication is a push request that comprises an attempt to initiate a connection with a callee;
   sending a push notification via said first internal server to said callee, wherein said first internal server has at least two interfaces, wherein each interface of said at least two interfaces comprises a User Datagram Protocol (UDP) port and a transmission control protocol (TCP) port, wherein said sending comprises:
      embedding, by said first internal server and inside said push notification, an external UDP (IP, port) pair, of said at least two interfaces, to which said callee is able to connect;
   concurrently using said UDP port and said TCP port to initiate a call or accept a call;
   utilizing said UDP port as a default port of at least said UDP port and said TCP port; and
   if said UDP port is determined to be working, terminating a use of said TCP port.

2. The non-transitory computer-readable storage medium of claim 1, further comprising instructions for:
   receiving communication from at least one of a second internal server of said system, said caller, and said callee, wherein said receiving communication comprises:
      receiving bundled information, wherein separate portions of said bundled information are capable of being serially sent or received between said first internal server, said second internal server, said caller, and said callee.

3. The non-transitory computer-readable storage medium of claim 1, further comprising instructions for:
   seamlessly switching between network types associated with said callee and said caller, utilizing said UDP port.

4. The non-transitory computer-readable storage medium of claim 1, further comprising instructions for:
   relaying, by said first internal server, a set of communications between said caller, a second internal server, and said callee, wherein said set of communications comprises at least said first communication.

5. The non-transitory computer-readable storage medium of claim 1, further comprising instructions for:
   interpreting, by said first internal server, information contained within a control packet sent as part of said push request.

6. The non-transitory computer-readable storage medium of claim 1, further comprising instructions for:
   decrypting, by said first internal server, a control packet received at said first internal server, said control packet being part of said push request.

7. The non-transitory computer-readable storage medium of claim 6, further comprising instructions for:
   accessing, by said first internal server, a password encapsulated in a header of said control packet; and
   decrypting, by said first internal server, said control packet using said password.

8. The non-transitory computer-readable storage medium of claim 7, further comprising instructions for:
   comparing, by said first internal server, a first signature corresponding to said caller with a second signature positioned in said header; and
   authenticating said control packet, by said first internal server, if said first signature matches said second signature and said decrypting is successful.

9. The non-transitory computer-readable storage medium of claim 1, further comprising instructions for:
   receiving dynamic configuration information from a second internal server of said system, wherein said dynamic configuration information comprises a selected protocol to utilize based on caller information and callee information, wherein said caller information and said callee information comprises a device time and a memory time of said caller and said callee, and wherein said selected protocol comprises a best fit method, wherein said selected protocol comprises an audio/video protocol.

10. A system for reducing a call establishment time in real-time communication between at least two devices, said system comprising:
    a first internal server coupled with a second internal server, said first internal server comprising:
       a push request receiver configured for receiving, at a first internal server of a system, a first communication from a caller, wherein said first communication is a push request and an attempt to initiate a connection with a callee; and
       a push notification sender configured for sending a first push notification via said first internal server to said callee, wherein said first internal server has at least two interfaces, wherein each interface of said at least two interfaces comprises a User Datagram Protocol (UDP) port and a transmission control protocol (TCP) port, wherein an external UDP (IP, port) pair, of said at least two interfaces, is embedded inside said push notification, such that said callee is able to connect to said external UDP port, and wherein said UDP port and said TCP port are concurrently used to initiate a call or accept a call, said UDP port is utilized as a default port of at least said UDP port and said TCP port, and if said UDP port is determined to be working, a use of said TCP port is terminated.

11. The system of claim 10, wherein said first internal server further comprises:
    a communication receiver configured for receiving communication from at least one of said second internal server of said system, said caller, and said callee, wherein said communication comprises:
bundled information, wherein separate portions of said bundled information are capable of being serially sent or received between said first internal server, said second internal server, said caller, and said callee.

12. The system of claim 10, wherein said first internal server further comprises:
a security module coupled with said first internal server and comprising a control packet, said control packet interpreter configured for interpreting information contained within a control packet sent as part of said push request.

13. The device of claim 12, wherein said security module further comprises:
a decrypter configured for decrypting a control packet received at said first internal server, said control packet being part of said push request.

14. The system of claim 13, wherein said security module further comprises:
a password accessor configured for accessing a password encapsulated in a header of said control packet, wherein said decrypter is further configured for decrypting said control packet using said password.

15. The system of claim 14, wherein said security module further comprises:
a signature comparer configured for comparing a first signature corresponding to said caller with a second signature positioned in said header; and
a control packet authenticator coupled with said signature comparer, said control packet authenticator configured for authenticating said control packet, if said first signature matches said second signature and said decrypting is successful.

16. The system of claim 10, wherein said first internal server further comprises:
a dynamic configuration information receiver configured for receiving dynamic configuration information from said second internal server, wherein said dynamic configuration information comprises a selected protocol to utilize based on caller information and callee information, wherein said caller information and said callee information comprises a device time and a memory time of said caller and said callee, and wherein said selected protocol comprises a best fit method and is an audio/video protocol.

* * * * *